United States Patent
Birolleau et al.

(10) Patent No.: US 9,712,027 B2
(45) Date of Patent: Jul. 18, 2017

(54) DEVICE FOR GUIDING A SET OF ELECTRICAL WIRES FOR ELECTRIC MOTOR ROTOR

(71) Applicant: RENAULT s.a.s., Boulogne Billancourt (FR)

(72) Inventors: Damien Birolleau, Montigny le Bretonneux (FR); Nicolas Bruyere, Vert Saint Denis (FR); Patrick Orval, Orsay (FR); Denis Formosa, Saint Brice Sous Foret (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 577 days.

(21) Appl. No.: 14/363,582

(22) PCT Filed: Nov. 22, 2012

(86) PCT No.: PCT/EP2012/073304
§ 371 (c)(1),
(2) Date: Jun. 6, 2014

(87) PCT Pub. No.: WO2013/083407
PCT Pub. Date: Jun. 13, 2013

(65) Prior Publication Data
US 2014/0368068 A1 Dec. 18, 2014

(30) Foreign Application Priority Data

Dec. 8, 2011 (FR) ..................................... 11 61345

(51) Int. Cl.
*H02K 15/09* (2006.01)
*H02K 3/34* (2006.01)
(Continued)

(52) U.S. Cl.
CPC ............... *H02K 15/09* (2013.01); *H02K 3/48* (2013.01); *H02K 3/527* (2013.01); *H02K 3/34* (2013.01); *Y10T 29/53143* (2015.01)

(58) Field of Classification Search
CPC H02K 1/26; H02K 1/265; H02K 3/32; H02K 3/325; H02K 3/34; H02K 3/345;
(Continued)

(56) References Cited

U.S. PATENT DOCUMENTS 2,872,605 A 2/1959 Moore et al.
2004/0155550 A1 8/2004 Yamamoto et al.
(Continued)

FOREIGN PATENT DOCUMENTS

| JP | 7-36561 U | 7/1995 | |
|---|---|---|---|
| JP | 2003-23743 A | 1/2003 | |
| JP | 2012100514 A | * 5/2012 | ............... H02K 1/24 |

OTHER PUBLICATIONS

Furukawa (JP 2012100514 A) English Translation.*
International Search Report issued Jan. 3, 2013, in PCT/EP12/073304 filed Nov. 22, 2012.

*Primary Examiner* — Michael Andrews
*Assistant Examiner* — Robert E Mates
(74) *Attorney, Agent, or Firm* — Oblon, McClelland, Maier & Neustadt, L.L.P.

(57) ABSTRACT

A guiding device for coiling electrically conducting wires around an electrically conducting block of a rotor of an electric motor including a shaft extending axially in the rotor, the electrically conducting block including at least four notches for receiving wires. The guiding device includes at least two branches extending radially away from the shaft and disposed at 90° to one another, the branches being connected by an elastic linking mechanism.

11 Claims, 4 Drawing Sheets

(51) Int. Cl.
*H02K 3/48* (2006.01)
*H02K 3/52* (2006.01)

(58) Field of Classification Search
CPC .. H02K 3/48; H02K 3/46; H02K 1/24; H02K 15/09; H02K 3/527; Y10T 29/53143
USPC .......................................... 310/66, 194, 209
See application file for complete search history.

(56) References Cited

U.S. PATENT DOCUMENTS

| | | | |
|---|---|---|---|
| 2007/0046132 A1* | 3/2007 | Yamamoto | H02K 3/325 310/216.012 |
| 2007/0194653 A1 | 8/2007 | Prokscha et al. | |
| 2009/0267443 A1* | 10/2009 | Kim | H02K 1/18 310/216.109 |

* cited by examiner

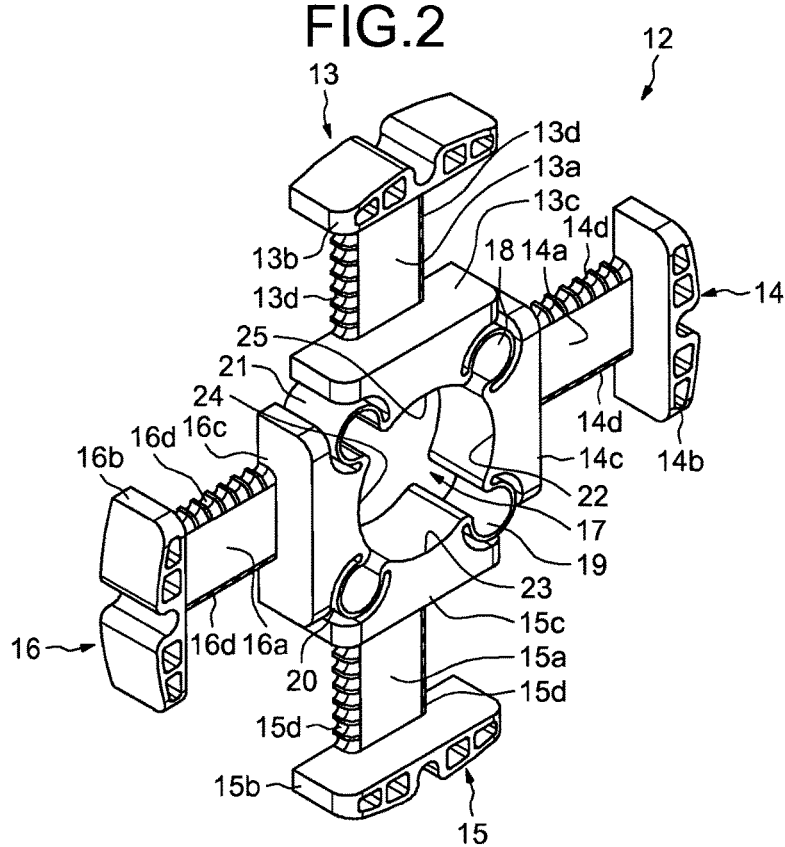
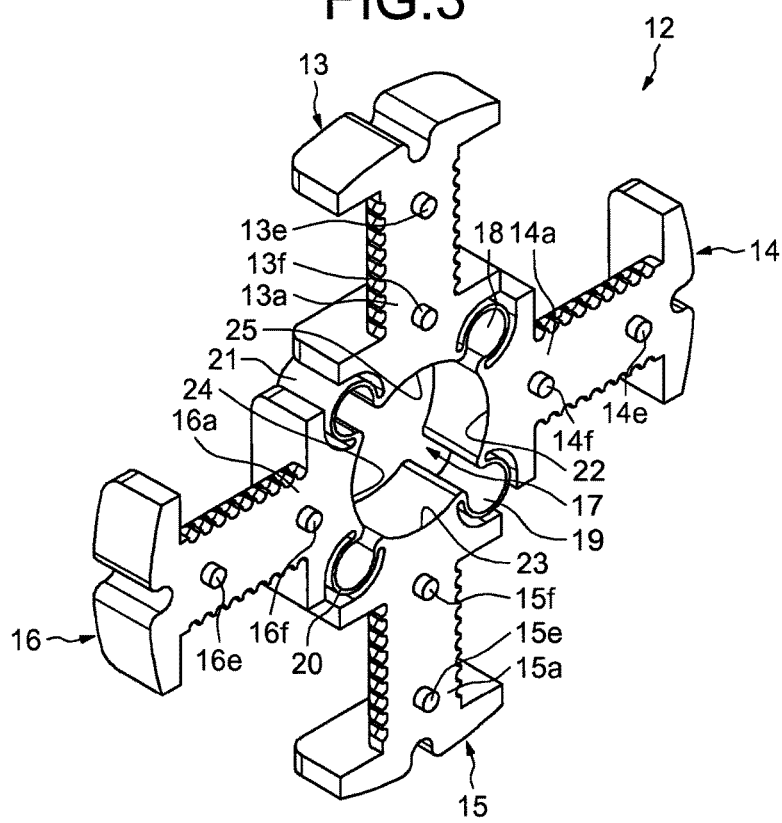

DEVICE FOR GUIDING A SET OF ELECTRICAL WIRES FOR ELECTRIC MOTOR ROTOR

The present invention relates to the field of high-speed generators and more particularly to devices for fixing coils of electrically conductive wires to the rotors of such generators, especially around an electrically conductive block of the rotor.

An electric motor with a wound rotor, such as an electric machine used in an automotive vehicle with electric drive, is implemented using electrically conductive wires such as enameled copper wires. The electrically conductive wires are wound around a core produced from a stack of electrically conductive sheet metal plates.

Rotors adapted to high-speed generators are subjected to harsh operating conditions and especially to high mechanical stresses in the radial direction. It is therefore necessary to retain securely the windings of a rotor subjected to strong centrifugal forces. The rotors of such generators must therefore be adapted to operate in such conditions.

Reference may be made in this regard to EP 142 1663 which describes a rotor comprising an axially extending shaft, four pole pieces extending radially away from the shaft, four arms each connected to a respective pole piece and means for retaining a winding of a rotor of a high-speed generator. The retaining means are formed by four curved supports each covering an arm, four cap devices each covering a support and able to prevent displacement of the coil wires while the rotor spins, and corner flanges between each support to provide additional support for the windings of the coils.

However, such a retaining device is formed by a plurality of distinct parts so that it is complex to implement and cannot be adapted to the pole pieces in the event of tolerance errors during the production of the different parts.

It is therefore the object of the present invention to remedy these disadvantages.

One objective of the invention is therefore to provide a rotor incorporating a guide device of one-piece construction which enables a winding of wires to be fixed and retained in a reliable manner while being of low cost.

Another objective of the invention is to provide such a device allowing radial and angular deformation in order to be simple to implement on a rotor.

According to one embodiment, the subject matter of the invention is a device for guiding the winding of electrically conductive wires around an electrically conductive block of a rotor of an electric motor, comprising a shaft extending axially in the rotor, said electrically conductive block being provided with at least four notches for receiving the wires.

The guide device comprises at least two branches extending radially away from the shaft and disposed at 90° to one another, said branches being connected by an elastic linking means.

Thus, the one-piece construction of the guide device simplifies its manufacture and facilitates its installation on the rotor, owing to the elastic linking means. Indeed, the elastic connection between each adjacent branch provides the guide device with good elasticity when installing it on the electrically conductive block, especially on each pole, as well as good tolerance of errors resulting from the industrial production of the rotor of the guide device. The elastic connection also allows independent displacement of each pole of the electric machine and of each branch of the guide device in the radial direction. Apart from the ease of installation, this allows adaptation to radial movements during the operation of the rotor, for example, adaptation to movements of the poles due to thermal expansion of the poles, etc.

Advantageously, each branch of the guide means includes at least two sets of guide grooves designed to cooperate with the receiving notches of the conductive block. In this way, each set of wires is positioned in a respective notch of the conductive block, that is, of one of the poles, and in a plurality of guide grooves of a branch.

The elastic linking means may have a rounded shape, for example an omega shape. Such a shape makes possible a guide device able to adapt itself to radial displacement of the poles, and able to be displaced angularly in order to be centered on the poles during its installation.

Advantageously, each branch comprises a main portion for receiving a set of wires which is delimited radially by two shoulders present at respective ends of each branch, each main portion being designed to cooperate with a receiving notch and comprises including a set of guide grooves. The main portion enables the set of wires to remain in position between two shoulders of each branch, and therefore to remain in the receiving notch of each pole.

In addition, each branch comprises at least two positioning means projecting towards the conductive block, for example positioning pins designed to cooperate with a plurality of holes formed in the conductive block. In this way, each branch is positioned independently on the conductive block, and specifically on a pole.

The holes may have a circular, oblong or teardrop shape. The elongated shape of the holes allows the guide device to retain its flexibility in the radial direction and makes possible its rapid and effective positioning on the rotor poles. Indeed, as the guide device is fitted to the conductive block it is first slightly stretched radially so that each pin moves into position in the different holes. The guide device is then slackened and, through the elastic effect of the elastic connections, the guide device returns to its initial position, so that the pins are subjected to a radial load holding them in position in the corresponding holes and therefore retaining the guide device on the conductive block. The teardrop shape of the holes allows better centering of the guide device on each pole.

The guide device preferably comprises four branches arranged symmetrically with respect to the axis of symmetry of the rotor. For this purpose the electrically conductive block includes eight notches. The symmetry of the guide device allows it to be positioned on any pole of the rotor. Moreover, the guide device is designed to be utilized on both sides.

Advantageously, each adjacent elastic linking means is connected by a rounded portion delimiting a central portion through which the shaft of the rotor can pass. The substantially circular passage portion may have an internal radius of at least 35 mm, for example of 46 mm. This radius is sufficient to allow not only the rotor shaft, but also the support of the rings electrically connecting the winding to the external electrical supply, to pass through the device during assembly of the electric machine. The ring support also has electrical terminals for connection to the winding which project radially from the shaft and may extend beyond the central passage portion. The elastic omega shapes must preferably have a passage zone with sufficient clearance to allow the connecting terminals to pass through. This characteristic allows the use of a second press for assembling the machine to be dispensed with, the press which positions the shaft in the conductive block being the same as the press which positions the rings of the rotor.

According to a second aspect, the invention relates to a rotor of an electric motor comprising a shaft extending axially in the rotor, an electrically conductive block extending radially away from the shaft of the rotor and a device as previously described for guiding electrically conductive wires around said block.

Other objectives, characteristics and advantages of the invention will be apparent from a reading of the following description, given solely as a non-limiting example and with reference to the appended drawings, in which:

FIG. 2 is a perspective front view of a guide device according to FIG. 1;

FIG. 3 is a perspective rear view of a guide device according to FIG. 1;

Figure 1:
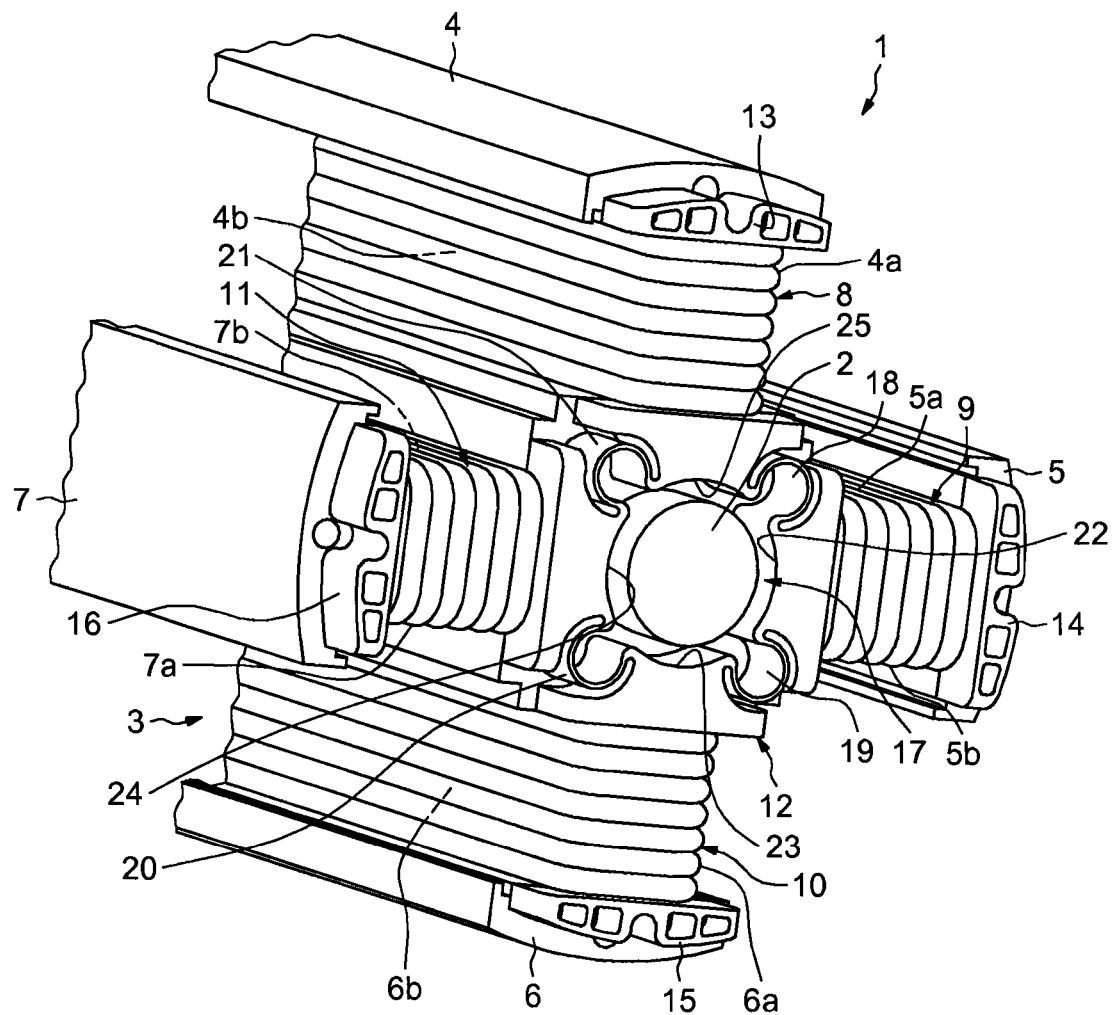
FIG. 1 is a schematic perspective view of a rotor of an electric motor according to the invention.

As illustrated in FIG. 1, a rotor of an electric machine, denoted as a whole by reference 1, comprises a shaft 2 extending axially through the rotor 1 and an electrically conductive block 3 extending radially away from the shaft 2.

The electrically conductive block 3 comprises four poles 4, 5, 6, 7 disposed at an angle, for example of 90°, with respect to one another. Each pole 4, 5, 6, 7 has two lateral faces each including a notch, 4a, 4b, 5a, 5b, 6a, 6b, 7a, 7b, for receiving a set of electrically conductive wires 8, 9, 10, 11. Alternatively, the four poles 4, 5, 6, 7 may be coupled together or implemented in a same stack of sheet metal plates so as to form a stack of cruciform sheet metal plates.

The rotor 1 includes a device 12 for guiding electrically conductive wires 8, 9, 10, 11 around the electrically conductive block 3, in particular around each pole 4, 5, 6 7.

In the example illustrated in the figures, the guide device 12 comprises four branches 13, 14, 15, 16 which extend radially away from the shaft 2 of the rotor 1 and are symmetrical with respect to the axis of the rotor 1. Each branch 13, 14, 15, 16 is designed to be fixed to a pole 4, 5, 6, 7 of the rotor 1 in such a way that winding of the four coils of wires 8, 9, 10, 11 is possible. The guide device 12 is substantially cruciform in shape and has a central portion 17 through which the shaft 2 of the rotor 1 passes. The branches 13, 14, 15, 16 of the guide device 12 are disposed at 90° to one another and are connected by an elastic linking means 18, 19, 20, 21 having, for example, a rounded shape connecting two adjacent branches, or an omega shape. In this way the one-piece construction of the guide device 12 simplifies its manufacture and, as a result of the elastic linking means 18, 19, 20, 21, facilitates its installation on the rotor 1.

The omega shape between each adjacent branch 13, 14, 15, 16 provides the guide device 12 with good elasticity for installing it on the electrically conductive block 2, specifically on each of the poles 4, 5, 6, 7, as well as with independent movement of each pole 4, 5, 6, 7 of the rotor 1 in the radial direction. In addition to facilitating installation, this permits adaptation to radial movements during operation of the rotor 1.

The elastic linking means 18, 19, 20, 21 are connected by a rounded portion 22, 23, 24, 25 so as to delimit the substantially circular passage 17 designed to surround the shaft 2 of the rotor 1. This passage 17 has an internal radius of, for example, 46 mm.

As illustrated in detail in FIG. 2, of which only the branch 13 will be described in detail, the other branches 14, 15, 16 being identical to the branch 13, each branch 13 comprises a main portion 13a which is designed to receive a set of conductive wires 8 and is delimited by two shoulders 13b, 13c formed at respective ends of the corresponding branch 13. Each of the lateral edges of the main portion 13a is disposed opposite a notch 4a, 4b formed in the conductive block 3, so that a main portion 13a allows a set of wires 8 to remain positioned between the two shoulders 13b, 13c of a branch 13 and in the receiving notches 4a, 4b of each pole 4. Each conductive wire 8 is therefore wound around the main portion 13a of the guide device 12 between the two shoulders 13b, 13c in a direction parallel to the shoulders 13b, 13c. The shoulders 13b, 13c have a thickness allowing the conductive wire 8 to be wound around the main portion 13a in several layers and allowing the set of conductive wires 8 to be retained in the axis of the main portion 13a.

The main portion 13a includes a plurality of guide grooves 13d formed in each lateral edge of the main portion 13a and allowing the first layer of winding 8 to be guided in order to obtain a good distribution of the winding of conductive wires 8 over the full length of the main portion 13a separating the two shoulders 13b, 13c of a branch 13. Each lateral edge, and in particular the plurality of grooves 13d of a main portion 13a, is aligned with a notch 3c, 3d formed in the conductive block 3 in order to position the conductive wires 8 correctly.

Figure 4:
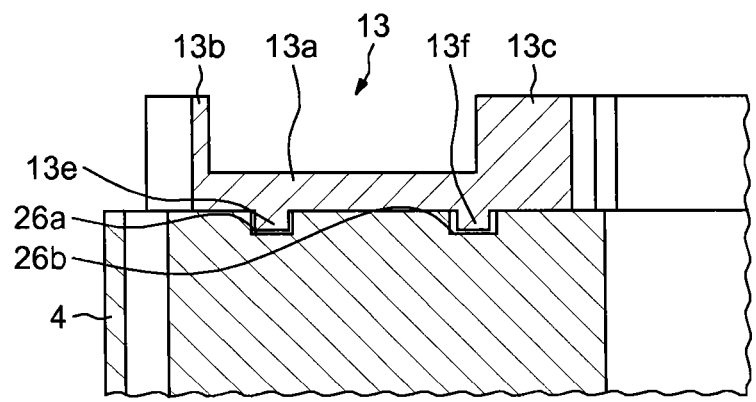
FIG. 4 is a partial sectional view of the rotor according to FIG. 1.

As illustrated in FIGS. 3 and 4, each main portion 13a, 14a, 15a, 16a includes, on a face in contact with the conductive block 3 opposite the face in contact with the conductive wires 8, 9, 10, 11, two aligned positioning pins 13e and 13f, 14e and 14f, 15e and 15f, 16e and 16f projecting towards the conductive block 3 and designed to cooperate with respective holes 26a, 26b formed in the conductive block 3. Thus, each branch 13, 14, 15, 16 can be positioned independently of another branch on the conductive block 3. For example, the first pin 13e, 14e, 15e, 16e arranged towards the outside of each branch 13, 14, 15, 16 is a centering pin, and the second pin 13f, 14f, 15f, 16f arranged towards the inside of each branch 13, 14, 15, 16 is a guide pin, so that only one of the two pins of a same pole is subjected to stress. The centering pin on each pole might equally be the one arranged towards the inside of each pole 4, 5, 6, 7.

The holes 26a, 26b may have, by way of a non-limiting example, a circular, oblong or teardrop shape. The elongated shape of the holes 26a, 26b enables the guide device 12 to retain its flexibility in the radial direction, and to be positioned rapidly and effectively on the poles 4, 5, 6, 7 of the rotor 1. The centering pins 13e, 14e, 15e, 16e, through which the guide device 12 is subjected to stress, are designed to cooperate with a preferably teardrop-shaped hole 26a, since the application of the stress in an angle allows better centering of the guide device 12 over the width of the branch of the rotor 1. The guide pins 13f, 14f, 15f, 16f can cooperate with any circular, oblong or teardrop-shaped hole 26b.

Figure 5:
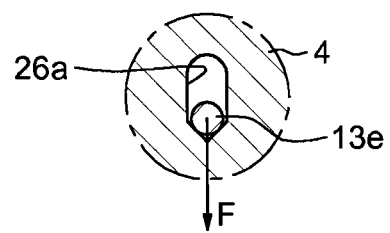
FIG. 5 shows schematically a hole formed in the rotor according to FIG. 4.

As illustrated in detail in FIG. 5, of which only the centering of the branch 13 will be described in detail, the other branches 14, 15, 16 being identical to the branch 13, when the guide device 12 is installed on the conductive block 3 the guide device 12 is first slightly stretched radially in such a way that each centering pin 13e moves into position in the different holes 26a. The guide device 12 is then slackened and, owing to the elastic effect of the elastic links 18, 19, 20, 21, the guide device 12 returns to its initial position following the direction of the arrow F, so that the pins 13e are subjected to a radial load allowing the pins 13e to be held in position in the corresponding hole 26a. The teardrop-shaped hole 26a has a V-shape enabling the centering pin 13e of the guide device 12 to be better centered.

Figure 6:
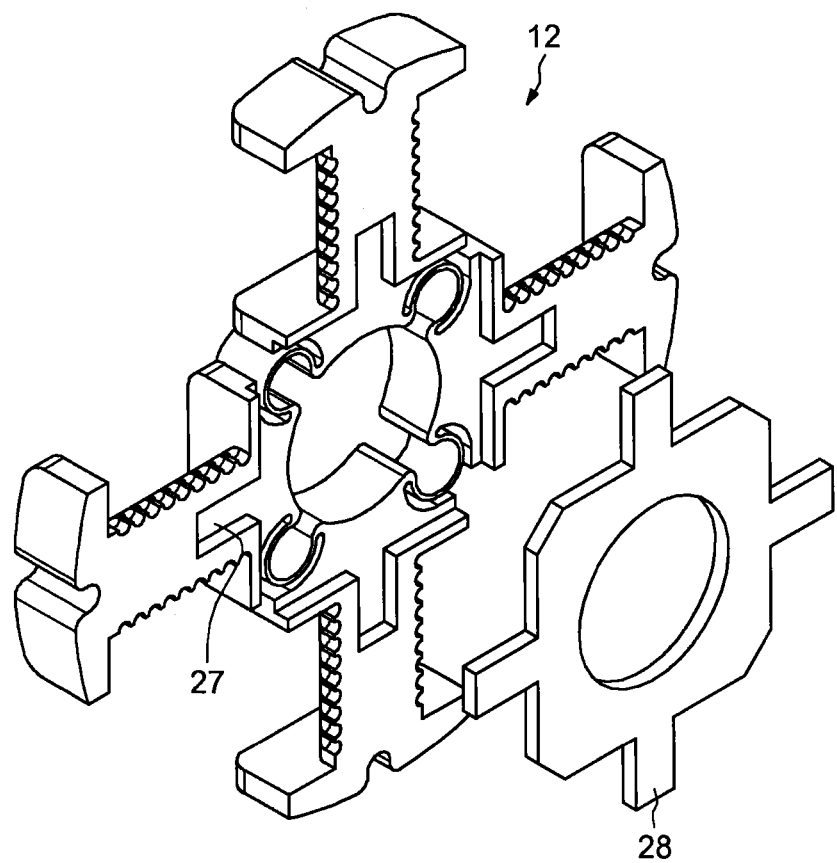
FIG. 6 is a perspective view of a guide device according to another embodiment.

In a variant as illustrated in FIG. 6, in which the same elements have the same references, these positioning pins may be replaced by a recessed profile 27 in the guide device 12 able to receive a steel part 28 which corresponds in shape to the recessed profile 27 and is welded to the electrically conductive block 3, leaving a passage for the shaft 2 of the rotor 1.

The guide device 12 is produced from a material of low conductivity and preferably low permeability, but with high temperature-resistance in relation to mechanical strength, and is produced, for example, by molding, for example from a duroplastic material.

As a result of the invention which has just been described, the guide device of one-piece construction allows easy fixing on the rotor as well as reliable retention of the winding of wires, while being of low cost.

In addition, such a device permits radial and angular deformation in order to be simple to implement on a rotor.

The invention claimed is:

1. A device for guiding a winding of electrically conductive wires around an electrically conductive block of a rotor of an electric motor, including a shaft extending axially in the rotor, the electrically conductive block including at least four receiving notches for receiving the wires, the device comprising:
   at least two branches extending radially away from the shaft and disposed at 90° to one another, the branches being connected by an elastic linking means, and
   wherein each branch includes at least two sets of guide grooves configured to cooperate with the receiving notches of the conductive block.

2. The guide device as claimed in claim 1, wherein the elastic linking means has a rounded shape.

3. The guide device as claimed in claim 2, wherein the rounded shape is an omega.

4. The guide device as claimed in claim 1, wherein each branch comprises a main portion for receiving a set of wires and that is delimited radially by two shoulders present at respective ends of each branch, each main portion configured to cooperate with a receiving notch and including the two sets of guide grooves.

5. The guide device as claimed in claim 1, wherein each branch comprises at least two positioning means projecting towards the conductive block and configured to cooperate with a plurality of holes formed in the conductive block.

6. The guide device as claimed in claim 5, wherein the holes have a circular, oblong, or teardrop shape.

7. The guide device as claimed in claim 5, comprising four branches.

8. The guide device as claimed in claim 7, wherein the four branches are symmetrical with respect to an axis of symmetry of the rotor.

9. The guide device as claimed in claim 7, wherein each adjacent elastic linking means is connected by a rounded portion delimiting a central portion through which the shaft of the rotor can pass.

10. The guide device as claimed in claim 9, wherein the rounded portion has an internal radius of at least 35 mm.

11. A rotor of an electric motor comprising:
    a shaft extending axially in the rotor;
    an electrically conductive block extending radially away from the shaft of the rotor; and
    a device according to claim 1 for guiding electrically conductive wires around the block.

* * * * *